UNITED STATES PATENT OFFICE.

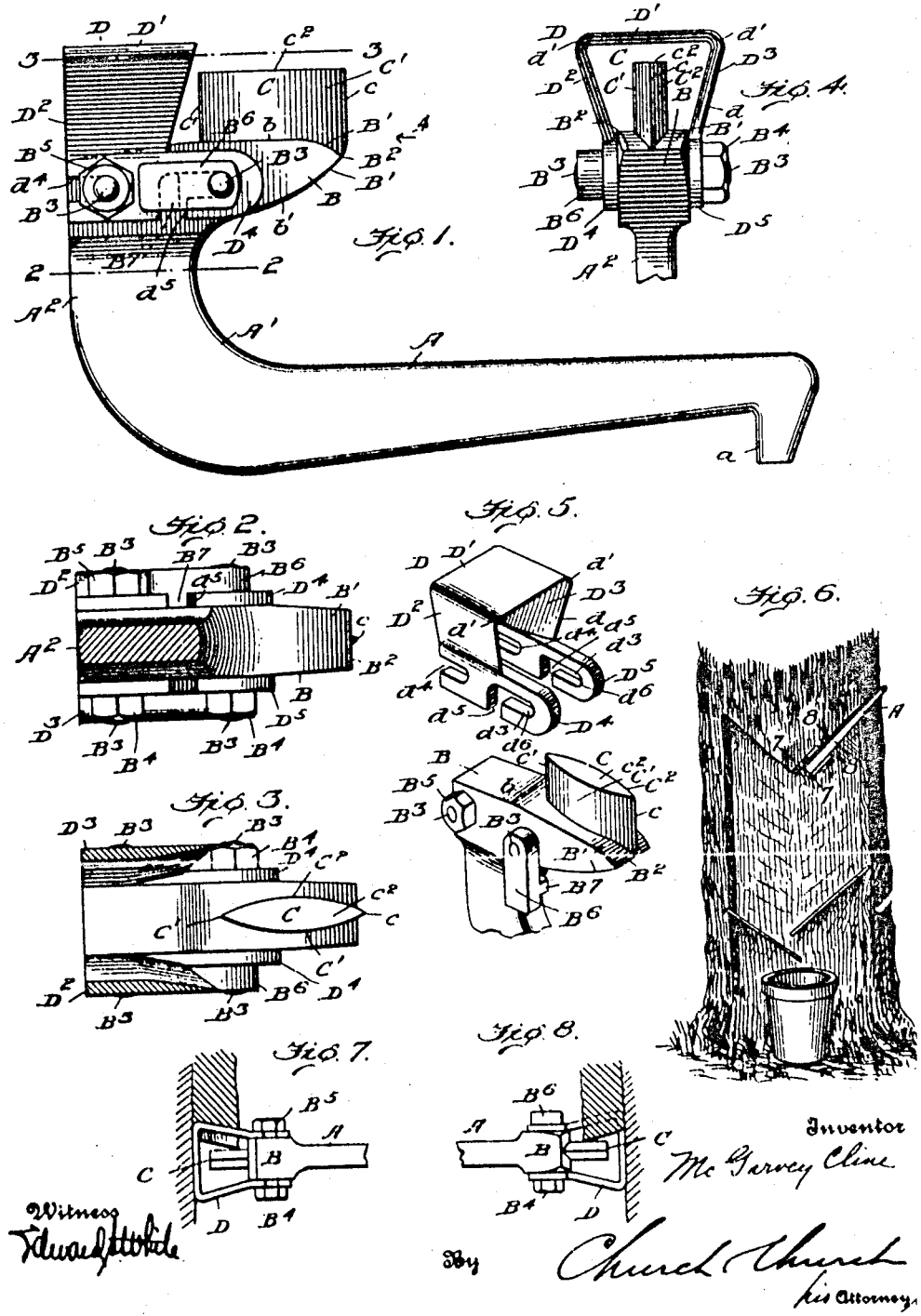

McGARVEY CLINE, OF JACKSONVILLE, FLORIDA, ASSIGNOR TO THE FLORIDA PINE COMPANY, OF JACKSONVILLE, FLORIDA, A CORPORATION OF DELAWARE.

TURPENTINE-HACK.

1,185,066.

Specification of Letters Patent. Patented May 30, 1916.

Application filed March 21, 1916. Serial No. 85,669.

*To all whom it may concern:*

Be it known that I, McGARVEY CLINE, a citizen of the United States, residing at Jacksonville, in the county of Duval and State of Florida, have invented certain new and useful Improvements in Turpentine-Hacks; and I do declare the following to be a full, clear, and exact description of the same when taken in connection with the accompanying drawings, forming part of this specification.

This invention relates to an improved turpentine hack for cutting streaks or chips from the bark of turpentine bearing trees, after a section of the bark has been removed from a tree to prepare the latter for the gathering of the turpentine.

One object of the invention is to provide a turpentine hack of maximum efficiency which will cut a streak from the bark of the tree in such manner that the incision made in the bark laterally of the tree inclines from the inner of the outer edge of the overhanging bark, so as to cause the turpentine to run down to the outer overhanging edge of the bark and drop to the receiver beneath, instead of running down the sides of the tree. The advantage of this lies in the fact that the turpentine is very much more quickly gathered in the receptacle, the juice dropping off the edge of the bark instead of running slowly down the side of the tree, and thus a great saving in turpentine is effected, since the time during which evaporation of the volatile spirit can take place is reduced to a minimum.

Another object of the invention is to provide a blade which can be readily and quickly detached from the shank or support of the tool, without complicating the construction and unduly increasing the cost of manufacture.

The invention therefore consists in a generally improved turpentine hack of maximum efficiency, as will appear from the ensuing detailed description when taken in connection with the accompanying drawings which illustrate a structural embodiment of the invention in a preferred form.

The novel features of the invention will be particularly pointed out and specified in the appended claims.

In the drawings: Figure 1 is a plan view of a turpentine hack constructed in accordance with the present improvements. Fig. 2 is a vertical section of the same on the line 2—2 of Fig. 1. Fig. 3 is a vertical section on the line 3—3 of Fig. 1. Fig. 4 is a front elevation of the hack looking in the direction of the arrow 4, of Fig. 1. Fig. 5 is a perspective of the hack showing the blade detached from the shank or support. Fig. 6 is a front view of a tree showing the operation of the hack in removing a chip or streak from the bark of the tree. Fig. 7 is a portion of a tree in section on the line 7—7 of Fig. 6, illustrating the way in which the bark is cut by the hack of the present invention. Fig. 8 is a portion of a tree in section on the line 8—8 of Fig. 6, looking in the opposite direction from that of Fig. 7.

Like characters of reference in the several figures indicate the same parts.

As shown more particularly in Fig. 1, the shank A of the hack upon which the blade is supported may be of any preferred form adapted to be secured to a suitable handle, not herein illustrated, and for this purpose, the lower end of the shank is provided with a hook $a$ whereby the shank may be sunk into the wood of a handle and secured therein. The upper end of the shank A, which, it will be understood, projects beyond the upper end of the handle to which the shank is attached, is curved, as shown at $A^1$, so as to provide a portion $A^2$ projecting substantially at a right angle from the main body portion of the shank. At the end of the angular portion $A^2$ there is a seat B, preferably formed integral with the shank and somewhat thicker in cross section than the shank proper. The seat B projects inwardly from the angular portion $A^2$ of the shank and the outer and inner sides $b, b'$ of the seat are curved or beveled, as shown at B' toward the inner or front edge $B^2$ of the seat for purposes which will presently appear. Said outer side $b$ is also inclined rearwardly, as shown. The rear or upper end of the seat is flush with the upper edge of the angular portion $A^2$ of the shank. Mounted on the outer side of the seat, and also preferably integral with the shank A, is the guide C having the flat-top $c^2$. The sides $C'$, $C^2$ of said guide are beveled or curved toward the front and rear edges $c$, $c'$ of the guide, the front edge $c$ of the guide lying in substantially the same plane as the front edge B² of the seat. The rear edge c' of the guide is positioned directly in front of the cutting edge of the blade, as will presently appear.

The blade D is preferably adapted to be detachably secured on the seat B of the shank, whereby the hack may be quickly supplied with a new blade when the edge of the blade mounted on the shank becomes dull after prolonged use. Said blade D is of a hollow formation having a top D', and sides D², D³, converging or inclining inwardly from the opposite ends of the top D' of the blade. The top D' and sides D², D³, of the blade are sharpened to form a continuous edge d which when a blade is positioned on the seat B lies just to the rear of the guide C. Said edge d at the sides D², D³ is inclined in the plane of the sides so as to make a shearing cut on the wood. The corners d' of the blade D, at the points where the sides D², D³ meet the top D', need be only slightly rounded, as shown. In fact, it is not the purpose of the invention, in this respect, to make a curved or rounded incision in the bark of the tree, but a straight sharp cut, as will hereinafter more fully appear.

At the free ends of the sides D², D³, of the blade are formed elongated portions, lettered respectively D⁴ and D⁵. These elongations D⁴, D⁵ are disposed in planes substantially at right angles to the plane of the top D' of the blade, it being understood that the sides D², D³ incline inwardly from the top D' toward the elongations. Each elongation is formed with a pair of slots d³, d⁴ and the forward slots d³ of each pair are L-shaped with the vertical portion d⁵ of the respective forward slots extending downwardly clear to the bottom edge of the elongations, and the horizontal portions d⁶ of said forward slots extending toward the front ends of the elongations. The rear slots d³ of the elongations extend inwardly horizontally from the rear edges of the elongations. Equally spaced on each side wall of the seat B is a pair of studs B³. Both studs on one side of said seat are preferably fitted with fixed heads B⁴, and the rear stud on the other side of the seat is also fitted with a fixed head B⁵ similar to the heads B⁴. The stud in front of the one having the head B⁵, however, is provided with a movable head B⁶, which in effect forms a lock lever. Said head B⁶ is preferably formed of a bar rotatably mounted on the proper stud B³ and having an inwardly projecting lug B⁷ adjacent its free end.

With the above construction, a blade may be readily applied to the seat B by slipping the vertical portions d⁵ of the forward slots in the elongations over the two front studs projecting from the sides of the seat, until the horizontal portions d⁶ of the front slots are in alinement with the front studs and also the free ends of the rear horizontal slots d⁴ are in alinement with the rear studs. When a blade is in this position on the seat, it is moved toward the rear of the latter, the four studs riding in the horizontal slots, until said studs come into engagement with the forward extremities of the slots. The blade is then properly positioned on the seat B, with the edge d of the blade facing the guide C, and may be securely locked thereon by rotating the lock lever B⁶ so as to cause the lug B⁷ thereof to enter the vertical portion d⁵ of the proximate slot. By rotating the lock lever B⁶ in the opposite direction so as to disengage lug B⁷ from slot d⁵ and moving the blade on its seat in the reverse direction to that previously described, the blade may be quickly detached from the seat on the shank, as will be readily understood without further description.

The use of the novel hack above described can best be understood by reference to Figs. 6 to 8 inclusive of the drawing. It will be first assumed that a tree has been properly prepared for the gathering of the turpentine by removing a section of the bark in such manner as to leave the edges of the bark, at the upper portion of the section from which the bark has been removed, inclined downwardly of the tree toward each other, as shown more particularly in Fig. 6. In the process of gathering turpentine, it is customary to remove a thin shaving from the bark at the upper edge of the section cut in the tree so as to gradually increase the height of the bare section, this operation being for the purpose of opening up the resin ducts which are mainly found in the bark of turpentine bearing trees.

The operation is known in the art as cutting the streak. It is for this use that the hack of the present invention has been devised, and when it is desired to cut a streak from the edge of the bark at the top of the base portion of the tree, the operator grasps the hack with both hands and assumes a position directly in front of the portion of the tree which is to be cut. In cutting the streak, the blade of the hack follows the inclined edge of the bark, the top D' of the blade resting against the trunk of the tree and the edge of said top making a vertical incision in the bark. With the top of the blade so positioned on the tree, the edge on one of the sides, such as the side D² lies in a plane laterally of the tree and the inclination of said side D² toward the shank will, when the edge is forced into the bark and the shank pulled toward the operator, cut a lateral incision in the bark of the tree which is inclined from the inner to the outer edge of the incision, as shown more particularly in Figs. 7 and 8. This leaves an undercut substantially straight edge on the bark of the tree, when a streak has been cut therefrom, which is very advantageous because of the fact that the exuding juice will run down the incline of the edge of the bark and drop directly into the receptacle, instead of running down and collecting on the side of the tree, during which a large proportion of the valuable volatile spirit of the juice, the turpentine, evaporates. The edges on both sides of the blade are used, since two tapering cuts are made in cutting the complete streak, the operator using one side edge in making the tapering cut on one side and the other side edge in making the tapering cut on the other side. During the cutting operation the side of the guide C rides on the overhanging edge of the bark in advance of the cutting edge of the blade, and the top of the guide rides on the side of the tree. The forward taper of the guide provides a sufficient clearance to prevent the guide from biting into the wood of the tree, and at the same time permits a considerable degree of freedom in the handling of the hack. The rearward taper of the sides of the guide provides a maximum clearance being the greatest possible space for the chip between the guide and the hollow blade, allowing the chip cut from the bark to pass freely through the blade. It is quite necessary that the chip be allowed to pass freely through the blade since otherwise, the hack may jamb into the bark of the tree, requiring the removal of considerable bark before the hack can be released. The lateral depth of the strip of bark removed is determined by the distance between the top D' of the blade and the shoulder formed by the seat B of the shank, while the vertical height of the strip removed is determined by the distance between a side of the blade and the proximate side of the guide. In practice the latter distance will be regulated so as to remove a strip from the bark only high enough to open up the resin ducts, the height of the removed strip being made as small as possible, since the bark is cut away vertically of the tree and the turpentine yield of the tree is dependent upon the number of times the operation of cutting the streak can be effected.

What is claimed is:

1. A turpentine hack embodying a support, a blade mounted on said support having a vertical cutting edge and a lateral cutting edge inclined at an acute angle directly from said vertical cutting edge, and a guide mounted on the support in front of the cutting edge of the blade and thereby adapted to ride on the edge of the bark in front of the blade to limit the thickness of the vertical incision made in the bark.

2. A turpentine hack embodying a support, and a hollow blade mounted on said support having a vertical cutting edge and a lateral cutting edge inclined inwardly at a lateral cutting edge inclined inwardly at an acute angle directly from said vertical cutting edge, substantially as set forth.

3. A turpentine hack embodying a support, and a hollow blade mounted on said support having a top edge and side edges inwardly inclined at an acute angle directly from said top edge toward the support.

4. A turpentine hack embodying a support, a hollow cutting blade mounted on said support, and a guide positioned on the support in front of the blade, said guide tapering toward the blade to afford a maximum clearance between the blade and the end of the guide facing the blade.

5. A turpentine hack embodying a support, a hollow blade mounted on said support having a top edge and side edges inwardly inclined from said top edge toward the support, and a guide positioned on the support in front of the blade having its sides tapered toward the blade to afford a maximum clearance between the blade and the end of the guide facing the blade.

6. A turpentine hack such as described embodying a support having a seat formed at one end thereof, studs projecting from the sides of said seat, a hollow blade having a top and sides which are adapted to engage the sides of said seat, the sides of said blade formed with slots for engagement with said lugs, to position the blade on the seat, and a locking member carried by one of said studs and adapted to be moved into one of said slots to lock the blade in position on the seat.

McGARVEY CLINE.

Copies of this patent may be obtained for five cents each, by addressing the "Commissioner of Patents, Washington, D. C."